United States Patent [19]
Roessler et al.

[11] Patent Number: 5,178,471
[45] Date of Patent: Jan. 12, 1993

[54] THRUST BEARING FOR TURBOCHARGER

[75] Inventors: Manfred Roessler, Manhattan Beach; Richard A. Hirchert, Pacific Palisades, both of Calif.

[73] Assignee: Allied-Signal Inc., Morristown, N.J.

[21] Appl. No.: 703,081

[22] Filed: May 20, 1991

[51] Int. Cl.⁵ .............................................. F16C 17/04
[52] U.S. Cl. .................................................... 384/369
[58] Field of Search .............. 384/420, 368, 369, 370, 384/424

[56] References Cited

U.S. PATENT DOCUMENTS

| | | | |
|---|---|---|---|
| 3,066,990 | 12/1962 | Fröhlich | 384/368 |
| 4,095,857 | 6/1978 | Palmer. | |
| 4,358,253 | 11/1982 | Okamo et al. | |
| 4,419,413 | 12/1983 | Ebihara. | |
| 4,479,728 | 10/1984 | Miller. | |
| 4,639,148 | 1/1987 | Tamura et al. | |
| 4,854,745 | 8/1989 | Kamimura et al. | 384/420 |

FOREIGN PATENT DOCUMENTS

| | | |
|---|---|---|
| 0092920 | 11/1983 | European Pat. Off. . |
| 90317 | 2/1896 | Fed. Rep. of Germany . |
| 811021 | 3/1959 | United Kingdom . |

Primary Examiner—Lenard A. Footland
Attorney, Agent, or Firm—Ken C. Decker; William N. Antonis

[57] ABSTRACT

A thrust bearing for constraining axial movement of the shaft of a turbocharger is made from two separate components which are assembled together, thereby simplifying manufacturing since no drilling is required. The components each include cooperating contoured surfaces for forming the oil feed holes which extend between the working surfaces of the thrust bearing, the oil feed passages, which communicate oil to the oil feed holes, and an oil gallery, which communicates oil to the oil feed passages. The oil gallery is entirely internal to the turbocharger, thereby minimizing oil side leakage. The gallery is fed from the turbocharger lubricating oil supply through an aperture extending through one of the sides of the thrust bearing in communication with the gallery.

8 Claims, 2 Drawing Sheets

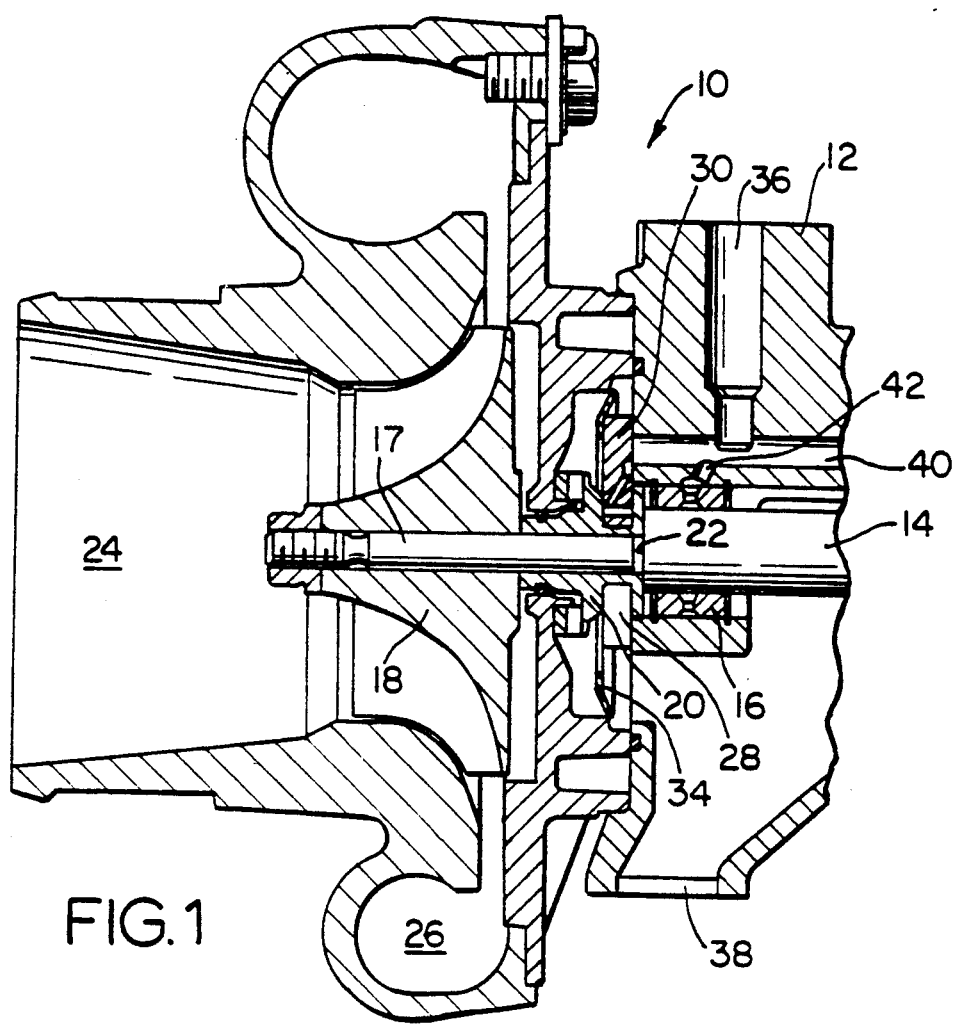
FIG. 1
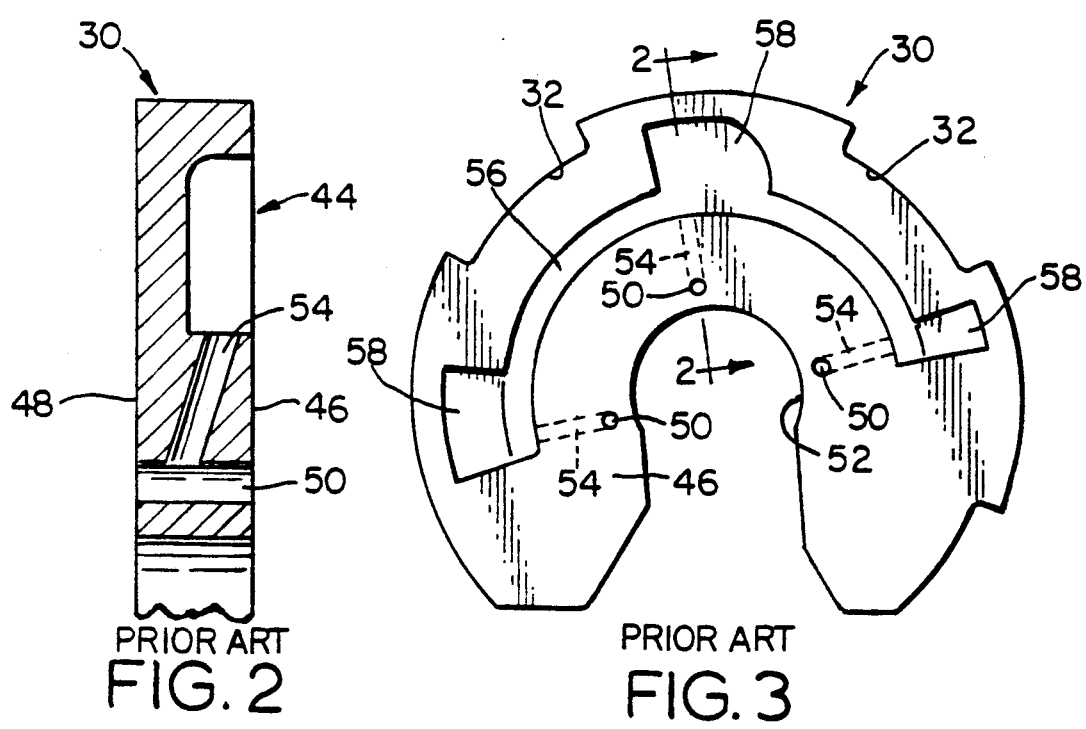
PRIOR ART
FIG. 2
PRIOR ART
FIG. 3

THRUST BEARING FOR TURBOCHARGER

This invention relates to a thrust bearing for a turbocharger.

Exhaust gas driven turbochargers include a shaft rotatably supported within a turbocharger housing by oil lubricated bearings. A compressor wheel is mounted on one end of the shaft, and a turbine wheel is mounted on the other end of the shaft. Exhaust gases traveling through the turbine wheel drive the shaft at a relative high speed (often in excess of 100,000 rpm), thus rotating the compressor wheel to compress air which is delivered to the vehicle induction manifold. Axial displacement of the turbocharger shaft is resisted by a nonrotating thrust bearing. Since the shaft rotates at high speed, the interface between the thrust bearing and the shaft must be lubricated. Lubricating oil fed into the housing not only lubricates the bearings, but also lubricates the interface between the thrust bearing and a circumferential groove in a bushing which rotates with the shaft. The oil for lubricating the thrust bearing must be fed through the thrust bearing through extremely small passages, some of which must be drilled at angles. Accordingly, broken drills and a relatively high scrap rate for the thrust bearings are common.

The present invention solves this problem by assembling the thrust bearing from two separate powdered metal components, each of which is contoured to cooperate with corresponding contours in the other component to form the internal passages necessary to communicate lubricating oil to the working surfaces of the thrust bearing. Accordingly, the requirement for drilled holes is eliminated. Furthermore, existing thrust bearings require an external oil gallery. An internal gallery is provided with the thrust bearing according to the present invention, thus substantially reducing leakage of lubricating oil.

These and other advantages of the present invention will become apparent from the following description, with reference to accompanying drawings, in which:

FIG. 1 is a fragmentary cross-sectional view of an exhaust gas driven turbocharger incorporating a thrust bearing;

FIG. 2 is an enlarged cross-sectional view of a prior art turbocharger thrust bearing taken substantially along lines 2—2 of FIG. 3;

FIG. 3 is a side view of the prior art turbocharger thrust bearing illustrated in FIG. 2;

Figure 4:
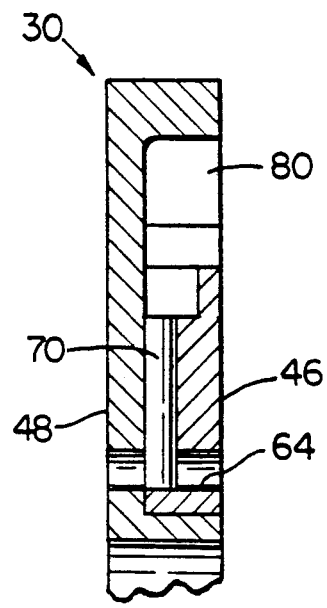
FIG. 4 is a cross-sectional view similar to FIG. 2 taken along lines 4—4 of FIG. 5 illustrating a turbocharger thrust bearing made pursuant to the teachings of the present invention.

Referring to FIG. 1, a turbocharger generally indicated by the numeral 10 includes a housing 12 which supports a shaft 14 therewithin by a bearing 16. The shaft 14 is stepped to define a reduced diameter portion 17 upon which a compressor wheel 18 is mounted. A bushing 20 rotates with the shaft 14 and is disposed between the shoulder 22 defined between the smaller diameter portion 17 of the shaft 14 and the larger diameter portion thereof and the compressor wheel 18. A turbine wheel (not shown) is mounted on the opposite end of the shaft 14, and a bearing (not shown) similar to the bearing 16 supports the end of the shaft 14 upon which the turbine wheel is mounted. Rotation of the compressor wheel 18 by rotation of the shaft 14 by communication of exhaust gases through the turbine wheel compresses air drawn through the inlet 24 and discharges the compressed air into outlet volute 26.

The bushing 20 defines a circumferentially extending groove 28 which receives a circumferentially extending thrust bearing 30 which is keyed against rotation relative to the housing 12 by keyways 32 (FIG. 3) and is restrained axially by conventional spring washer 34. The bearing 16 and thrust bearing 30 are lubricated by lubricating oil from the engine oil supply which is communicated into the turbocharger 10 through inlet 36 and drained back into the engine crankcase via drain 38. Axially extending passage 40 communicates lubricating oil to the bearing 16 through passage 42, and also communicates lubricating oil to the interface between the bushing 20 and thrust bearing 30 through oil passages generally indicated by the numeral 44 which extend through the thrust bearing 30.

The prior art thrust bearing 30 is illustrated in FIGS. 2 and 3. The thrust bearing 30 includes a pair of opposed working side surfaces 46, 48 which provide the interface with the rotating bushing 20. Lubricating oil is communicated to each of the surfaces 46, 48 through oil feed holes generally indicated by the numeral 50, which comprise part of the passages 44 and are drilled axially through the thrust bearing 30. The thrust bearing 30 is provided with a keyhole shaped slot 52 for receiving the bushing 20 and shaft 14. Oil is communicated to the oil feed holes 50 through oil feed passages 54 which extend generally radially with respect to the shaft 14, but because of manufacturing considerations, is drilled at an angle as illustrated in FIG. 2 because that is the way that a bit is moved into position to drill the passages 54. The oil feed passages 54 communicate oil from a generally circumferentially extending oil gallery 56. To permit a bit to be brought into the proper position to drill the oil feed passages 54, the gallery 56 is an external gallery, that is, it is open to the surface 46 and includes relieved portions 58, so that the bit can be brought into position to drill passages 54. The passages 54 and oil feed holes 50 are very small, which result in manufacturing problems because the bit used to drill these holes is easily broken. Another prior art method of drilling passages is to drill straight passages radially through the gallery 56 and then plug the outer diameter of the thrust bearing, but this method also presents manufacturing difficulties.

Accordingly, manufacturing costs of the thrust bearing 30 are high because of the difficulty in drilling the hole 50 and passages 54 in their proper positions. Furthermore, the external gallery 56, which is open to the surface 46, results in increased leakage from the interface between the passage 40 and the thrust bearing 30 (commonly referred to as oil side leakage) which results in increased oil consumption. The gallery 56 is fed from lubrication passage 40.

Figure 5:
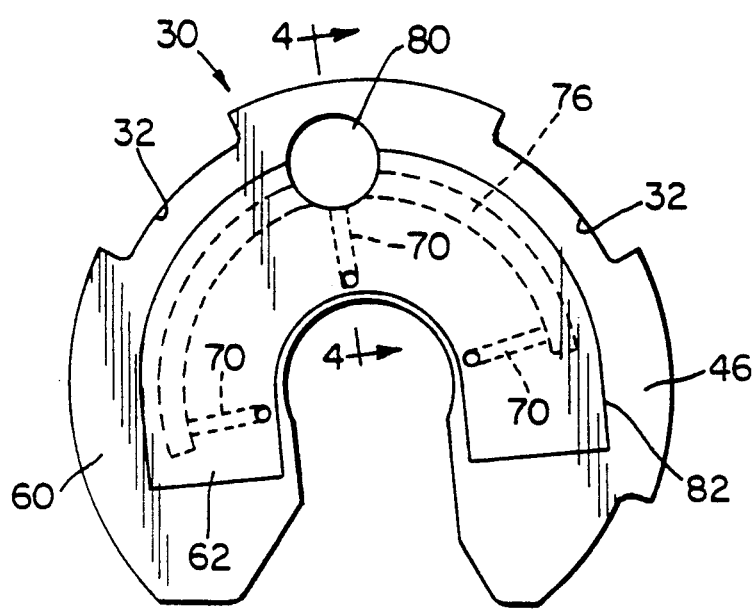
FIG. 5 is a side view of the thrust bearing illustrated in FIG. 4.
Figure 6:
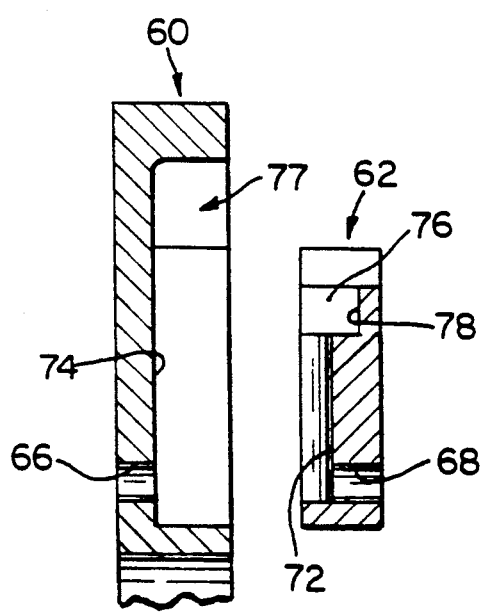
FIG. 6 is a view similar to FIG. 4, but illustrating the two components of the thrust bearing according to the present invention before assembly.

The improved thrust bearing according to the present invention is illustrated in FIGS. 4, 5 and 6. Referring to FIG. 6, the improved thrust bearing 30 comprises a pair of components 60, 62. Each of the components 60, 62 is made from a conventional powdered metal process in which metal is compressed in a mold to form the components 60, 62. The assembled thrust bearing 30 illustrated in FIGS. 4 and 5 includes an oil feed hole 64 which comprises section 66 extending through the component 60 and a section 68 extending through the component 62. Both of these sections 66, 68 may be formed by appropriate coring of the powdered metal molds in a way well known to those skilled in the art. The oil feed passages 70 are formed by appropriate contoured surfaces on the components 60 and 62, including circumferentially spaced, radially extending channels 72 on the component 62 and an appropriate contoured surface 74 which forms a part of a recess 77 in the component 60 which receives the component 62. Similarly, oil gallery 76 is a circumferentially extending (with respect to the shaft 14) internal slot within the thrust bearing 30. The oil gallery 76 is defined by a circumferentially extending contoured surface 78 formed on component 62 which cooperates with the contoured surface 74 on component 60 to define the oil gallery 76. Accordingly, the oil gallery 76 is internal to the thrust bearing 30, thereby minimizing oil side leakage from the thrust bearing 30, since such leakage will only occur around the aperture 80 which extends through the surface 46 of the thrust bearing 30 to communicate with the passage 40 so that lubricating oil might be delivered into the gallery 76. The interface between the components 60, 62 is indicated by parting line 82 in FIG. 5. The components 60, 62 are assembled by using a sintering process; that is, by installing the component 62 within the recess 77 in component 60 and then heating the thrust bearing 30 to a temperature below the melting point of the material from which the component 60 and 62 have been made, but sufficiently high that the components fuse together into an unitary thrust bearing.

We claim:

1. Thrust bearing for a turbocharger, said turbocharger including a shaft restrained against axial movement by said thrust bearing, said thrust bearing having a pair of opposite side surfaces and an aperture extending between said side surfaces for receiving said shaft, an oil feed hole extending between said side surfaces through said thrust bearing to supply lubricating oil to said side surfaces, an oil feed passage within said thrust bearing for communicating lubricating oil to said oil feed hole, said thrust bearing comprising a pair of components assembled together, said oil feed passage being partially defined on each of said components so that upon assembly of said components the oil feed passage is formed without drilling into said thrust bearing.

2. Thrust bearing for a turbocharger as claimed in claim 1, wherein said oil feed passage extends generally radially with respect to said shaft when the bearing is installed on the latter, said oil feed passage being defined by cooperating contoured surfaces on each of said components which form a closed oil feed passage when the components are assembled.

3. Thrust bearing for a turbocharger as claimed in claim 1, wherein an oil gallery is defined between said surfaces internally of said thrust bearing, said oil gallery being communicated with a source of lubricating oil through an opening extending through one of said surfaces, said oil feed passage communicating said gallery with the oil feed hole.

4. Thrust bearing for a turbocharger as claimed in claim 3, wherein each of said components include contoured surfaces, said contoured surfaces on each component cooperating to define said oil gallery when said components are assembled.

5. Thrust bearing for a turbocharger as claimed in claim 4, wherein said gallery extends generally circumferentially with respect to said shaft when the thrust bearing is mounted on the latter and said oil passage extends generally radially inwardly with respect to said shaft from said oil gallery to said oil feed hole.

6. Thrust bearing for a turbocharger as claimed in claim 4, wherein each of said components is made of compressed powdered metal and said components are assembled by a sintering process.

7. Thrust bearing for a turbocharger as claimed in claim 1, wherein said oil feed passage is defined by cooperating contoured surfaces on each of said components which form a closed oil feed passage when the components are assembled.

8. Thrust bearing for a turbocharger, said turbocharger including a shaft restrained against axial movement by said thrust bearing, said thrust bearing having a pair of opposite side surfaces and an aperture extending between said side surfaces for receiving said shaft, an oil feed hole extending between said side surfaces through said thrust bearing to supply lubricating oil to said side surfaces, an oil feed passage within said thrust bearing for communicating lubricating oil to said oil feed hole, an oil gallery disposed internally within said thrust bearing between said side surfaces and enclosed by said side surfaces for supplying lubricating oil to the oil feed passages, said gallery extending generally circumferentially with respect to said shaft when the thrust bearing is installed on the latter and the oil feed passage extending generally radially with respect to said shaft between the gallery and said oil feed hole, and an opening in one of said side surfaces for communicating lubricating oil into said gallery from outside of said thrust bearing, said thrust bearing comprising a pair of components assembled together, each of said components including contoured surfaces cooperating with corresponding contoured surfaces on the other component when the components are assembled to define said gallery and said oil feed passage.

* * * * *